Patented Sept. 20, 1938

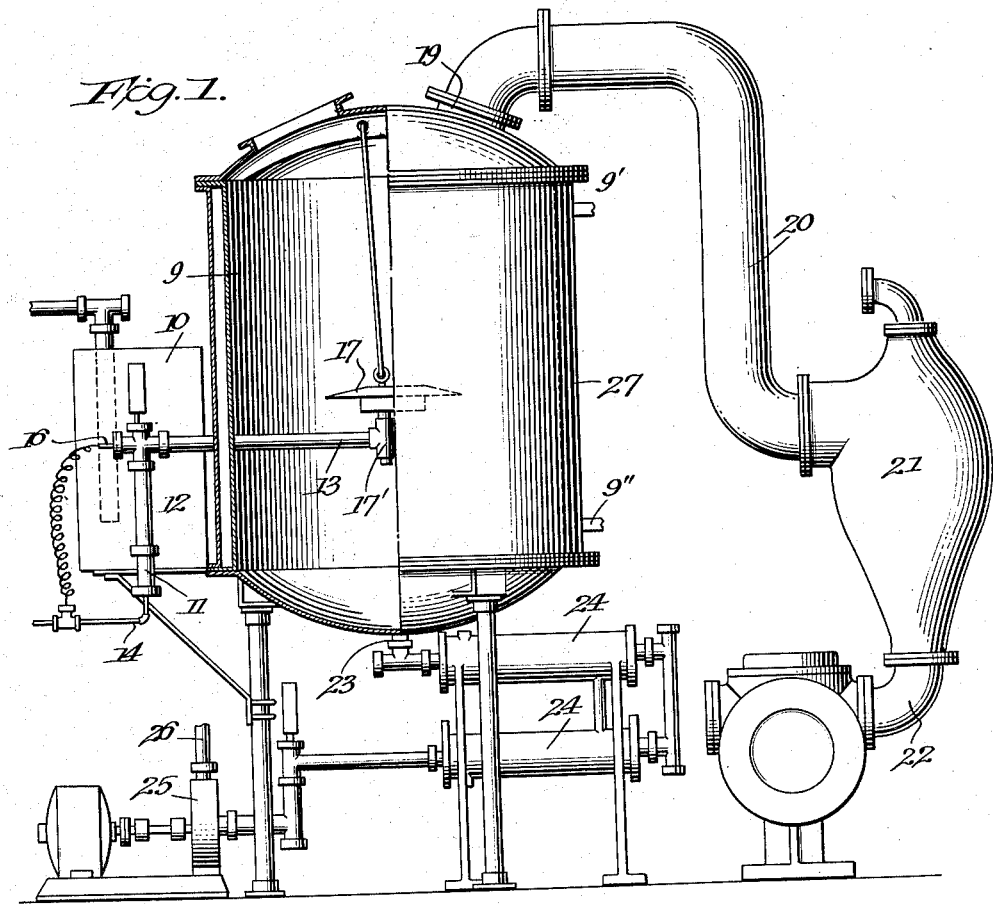

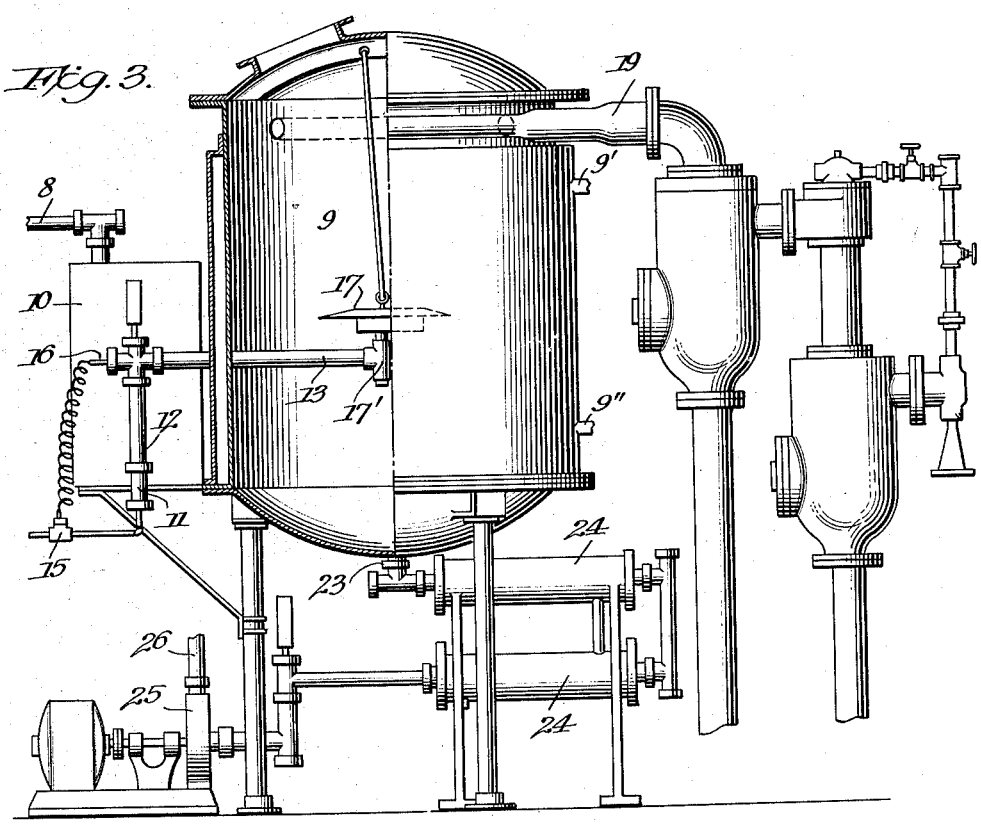
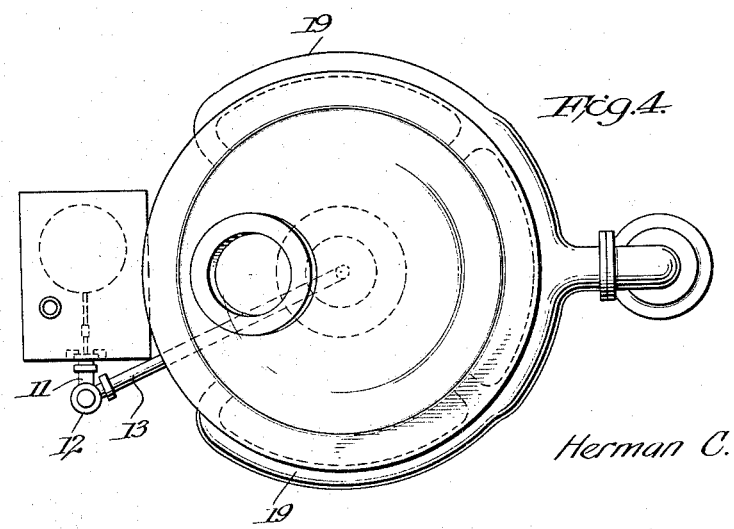

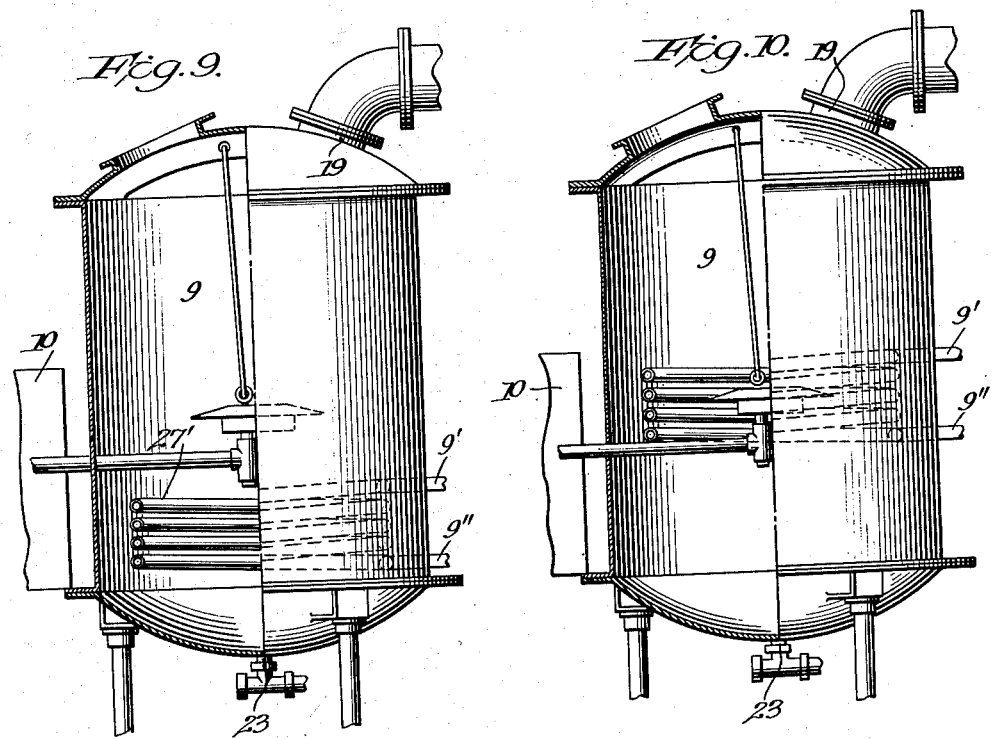
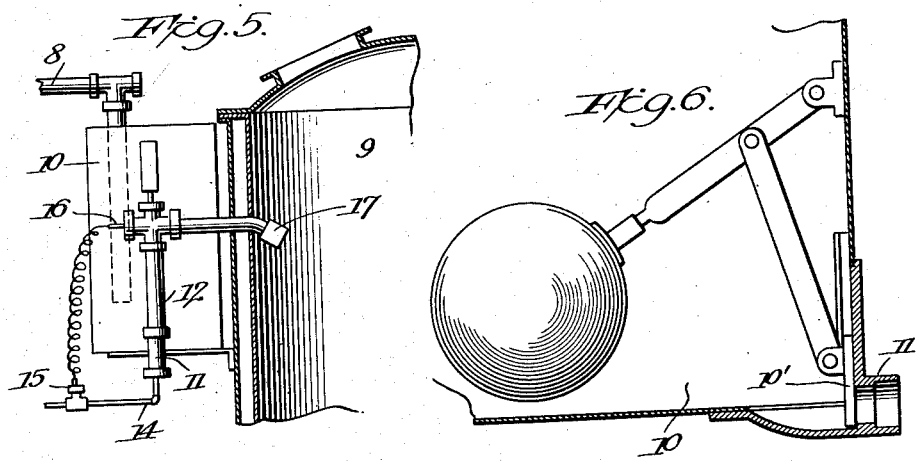
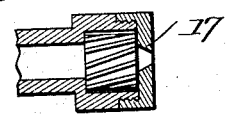

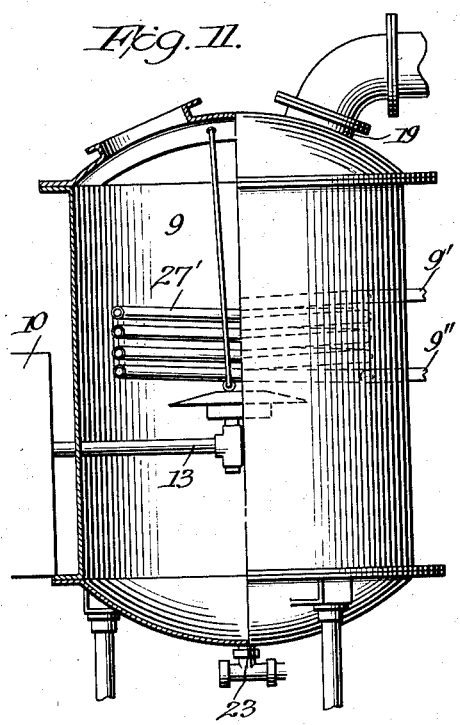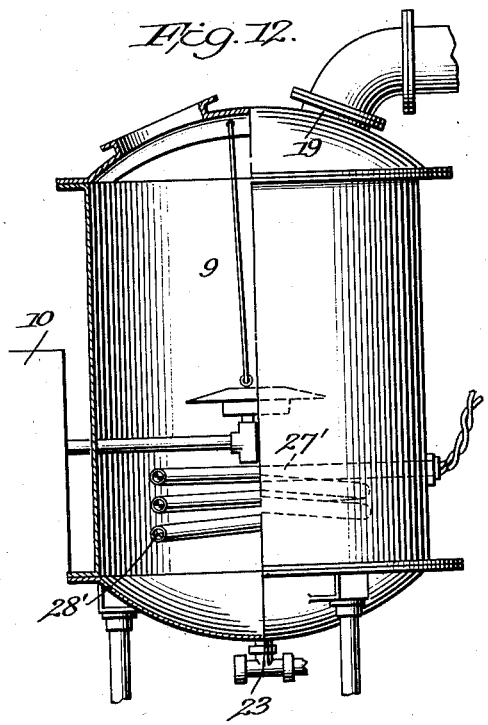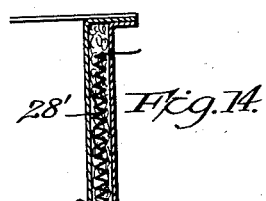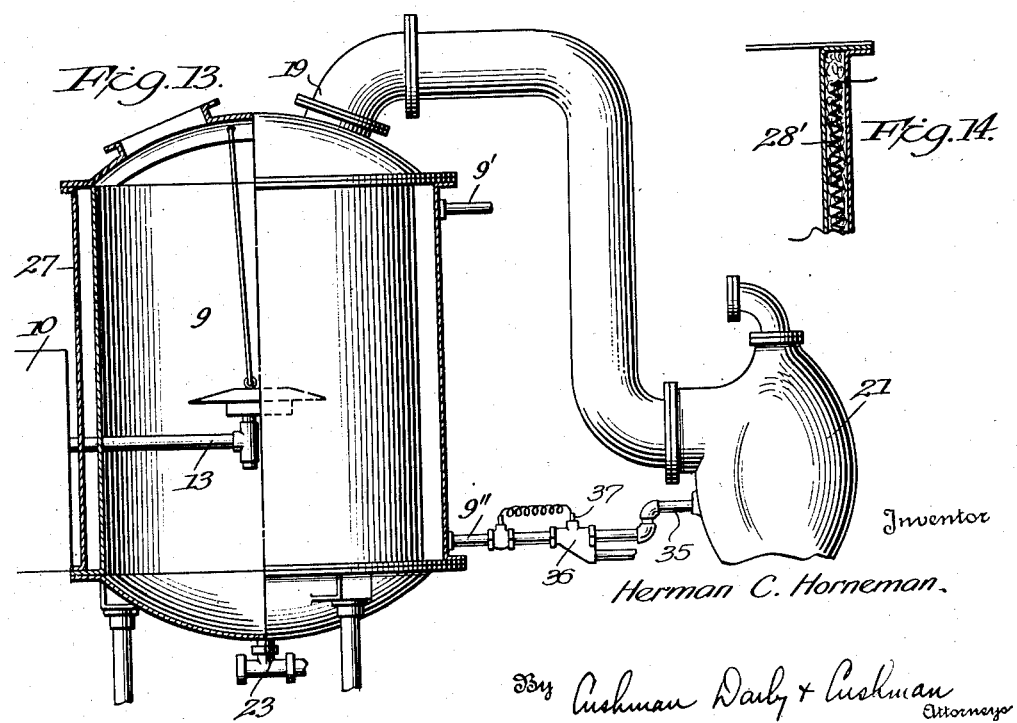

2,130,645

UNITED STATES PATENT OFFICE 2,130,645

APPARATUS FOR PASTEURIZING AND DE-ODORIZING LIQUIDS

Herman C. Horneman, Danville, Ill., assignor to Research Laboratories of National Dairy Products Corporation, Inc., Baltimore, Md., a corporation of Maryland Application July 21, 1933, Serial No. 681,656
Renewed March 11, 1938

2 Claims. (Cl. 99—251)

This invention relates to an apparatus for pasteurizing, deodorizing and cooling liquids, and also includes a method of pasteurizing, deodorizing and cooling milk products such as milk or cream used directly or in the manufacture of butter, cheese, ice cream and other dairy products.

The primary object of this invention is to provide an apparatus whereby milk or cream with an imparted flavor or flavors, due to fermentation and/or feeds can be restored to its natural flavor. While conventional methods of pasteurizing and cooling milk or cream do, to some extent, tend to improve the flavor of these products by partially volatilizing the off-flavor imparting substances from said products, the present invention augments and magnifies this volatilizing effect to such an extent as to reduce the off-flavors to a negligible quantity in the end-product.

In carrying out the present invention, very complete subdivision of cream or other lactic fluid is obtained with consequent maximum deodorization. This result is secured by first compressing the lactic fluid with steam or other inert gas while pasteurizing and mixing the fluid with the gas, and producing, initially, a division of the cream particles. This treatment of the cream is continued by introducing the compressed steam-water-cream mixture through a reduced outlet into a condition of reduced pressure, i. e. a vacuum chamber, whence a second extremely fine subdivision of the particles takes place. This is due to the release of the mixture from a state of compression to a condition of expansion.

This release results in instantaneous breaking up of the particles to a degree of subdivision heretofore unattained and takes place with violent and explosive force.

Briefly stated, subdivision of the particles is first carried out under a condition of compression immediately followed as a continuous step by greatly enhanced subdivision, made possible by the instantaneous release of the preliminarily divided particles from a state of compression to a condition of violent and, in fact, explosive expansion.

The vacuum chamber is characterized by being heated. In this manner, condensation of water vapors and odoriferous volatiles and their attendant objectional return to the cream is prevented.

Likewise, separation of liquid and vapor phase constituents is prolonged, and, moreover, more complete separation of liquid phase particles of cream is obtained. In fact, the cream-steam-water mixture is concentrated by removal of moisture and odoriferous volatile substances, with the result that the end product has improved organolyptic qualities and a substantially slightly reduced moisture content from that of the original cream. That is, although dilution will take place in the initial compression and shattering of the cream particles with steam, this water is removed in the subsequent expansion subdivision treatment, and the final effect is one of concentration of the original cream.

A particular object of this invention is to provide an apparatus whereby milk or cream or other milk products are improved by eliminating in large measure, volatile substances therefrom, thereby rendering them suitable for manufacture into cheese, butter and ice cream products of excellent quality.

A further object is to combine the operation of pasteurizing, deodorizing and cooling milk or cream in one compact unit, thereby reducing the amount of handling of these products and minimizing their exposure to metallic surface and other innocuous influences.

Other objects and novel features and advantages of this invention will be apparent from the following specification and accompanying drawings hereinafter more fully described and claimed. The preferred form and arrangement of my improved apparatus, as shown in the accompanying drawings, is as follows.

Referring to the drawings:

Figure 1 is an elevation partly in section of one form of apparatus.

Figure 2 is a detail view of the distributor head.

Figure 3 is an elevation partly in section of another form of apparatus.

Figure 4 is a top view of the apparatus shown in Figure 3.

Figure 5 is a view of a further embodiment of the invention.

Figure 6 is a detailed view of a float and slide valve.

Figure 7 is a detailed view of the nozzle shown in Figure 5.

Figure 8 is a detailed view of another type of distributor head,

Figure 9 is an elevation partly in section of a modification.

Figure 10 is an elevation partly in section of a modification.

Figure 11 is an elevation partly in section of a modification.

Figure 12 is an elevation partly in section of a modification.

Figure 13 is an elevation partly in section and showing a heating means for the circulating fluid, and Figure 14 is a fragmentary view of the heating jacket provided with an electrical heating means.

In Figures 1 and 3, 9 represents a closed metal container which is equipped to operate as a vacuum chamber, and has a removable cover for ready cleaning of the chamber. The liquid to be treated is introduced continuously into surge tank 10 through pipe 8 from a forewarmer, where it has been preliminarily heated to a suitable temperature. From a laterally extending outlet pipe 11, as shown in Figures 4 and 6, of the surge tank 10, the liquid is transferred through the pipe 12 and pipe 13 to the vacuum chamber 9, the reduced pressure in the latter obviating use of a pump. A steam line 14 has its open or outlet end in the line 12 above the outlet 11 and steam is introduced in sufficient quantity to heat the liquid in the line 12—13 to a pasteurizing temperature, which temperature is automatically maintained by a thermostatic control 15 activated from the bulb at 16. The cream-water-steam mixture from line 12—13 is distributed in vacuum chamber 9 by a distributing head 17, shown in detail in Figures 2 and 8, through the narrow preferably elongated or continuous, peripheral opening 18. Details of the construction of the distributor head 10 are shown in Figures 2 and 8 and will later herein additionally be referred to.

At the opening 18 the pressure of the liquid-steam-water mixture in the line 12—13 is suddenly released, due to the reduced pressure in chamber 9 and is thrown with spontaneous and violent force downwards into the chamber. The vapors and gases released by the introduction of the liquid-steam-water mixture into the vacuum chamber 9 through head 17 are carried off through the port 19 and pipe 20 to the condenser 21 and vacuum pump 22. The liquid portions of the cream or milk will coalesce and collect at the bottom of vacuum chamber 9 and will pass by outlet pipe 23 through the cooler system 24 and can be continuously removed and recovered by means of a suitable pump 25 through pipe 26.

Surrounding the chamber 9 is a spaced wall 27 constituting a jacket within which is circulated a heating medium such as gas or liquid, preferably hot water. The inlet and outlet for the circulating medium is indicated 9' and 9" respectively.

A preferred form of distributing head 17 is illustrated in detail in Figure 2 and supported on a sanitary T-coupling 17'. This distributing head comprises two members 28—29 adjustably connected by bolts 30 to vary the width of the spray outlet. The bolts are provided with wing nuts engaging springs disposed between the wing nut and the adjacent surface of the member 28. Interiorly of the member 28 are projections 30', through which the bolts extend and which projections are of equal length and of a size whereby suitable shims may be interposed between the bottom of the projections and the top surface of the member 29, to permit of an extremely fine and critical range of adjustment for the outlet opening 18. In this connection, the outlet opening 18 is substantially continuous or elongated and, as shown, is relatively narrow. The baffle 31 is connected to the head as shown and diverts the finely divided particles downwardly to reduce possibility of entrainment, as will later be described.

Referring to Figure 8, the head 17 comprises the two members 28, 29, which are centrally connected by a single bolt 30 and arranged about the bolt are a plurality of spacer members 28' having reduced ends 29' loosely disposed in the members 28 and 29 respectively. When it is desired to adjust the outlet opening between the members 28 and 29, suitable shims are fitted about the reduced ends of the spacer members to assure a very fine adjustment of the outlet opening 18.

A suitable float-operated slide valve 10', as shown in Figure 6, controls the outlet from the tank 10, which will overcome any possibility of releasing the vacuum in chamber 9 if the liquid reaches a predetermined depressed level, as when the cream supply temporarily stops.

The steam line 14 is projected into the line to have its outlet above the outlet from the tank 10. I find this is not only efficient in my process, but also overcomes any tendency for the steam to enter the tank and produce interruption of continuous flow of cream or milk in the line 12—13.

The head 17 is relatively small, as compared to the size of the chamber, as shown. It is preferably substantially centrally located, that is, sufficiently below the outlet port or ports 19 to prevent entrainment and far enough from the bottom of the chamber to give the falling particles projected from the head a sufficient time for adequate separation out of the vapor and liquid phase constituents and cooling of the latter.

The line 12—13 is of a length and diameter to enable the lactic fluid to be continuously supplied from tank 10 to the head 17 and the lactic fluid is simultaneously pasteurized and intimately mixed with the steam to be broken up and subdivided.

The heating jacket 27 assures that the inner wall surface of the chamber 9 will be at a constant temperature, and serves to reduce to a minimum the possibility of condensation of water vapors and gases on the wall, as well as produce a prolonged separation of vapor and odoriferous gases from the liquid phase particles.

The heating jacket 27 serves to maintain the chamber 9 at all times heated to the temperature of the boiling point of the cream or slightly higher, corresponding to the conditions of vacuum in chamber 9.

It will be observed that the cream is treated under a controlled temperature and under influence of the vacuum from the time it leaves the surge tank until the separated constituents are collected. That is, the cream is continuously under the influence of the vacuum i. e. a directional influence in the line 12—13, and a direct expansion in the chamber 9, and heated and compressed in the steam line and expanded and heated in the vacuum chamber.

The cooling means 24 operates to lower the temperature of the pumped cream, so that the latter will be substantially free of foaming when pumped continuously.

In Figure 5, I have illustrated an alternative arrangement in which one or more peripherally disposed spray nozzles 17 are provided. These nozzles 17 are preferably spaced apart and the jet openings are constructed to project the mixture toward the center of the chamber and slightly downwardly, to facilitate the gravity fall of the liquid phase of the steam-cream-water mixture. These nozzles are of any suitable design, such as commonly used for production of powdered dairy products by a spray process. The nozzles shown have a spirally grooved and loose member in advance of the outlet port and will produce the so-called solid cone spray.

The disclosure in Figure 3 is substantially similar to Figure 1, except there are a plurality of spaced suction outlets 19, as shown in Figure 4, and an ejector-condenser system is utilized instead of a wet pump and condenser as in Figure 1.

The pressure differential between the mixture in the line 12—13 and the vacuum chamber 9, and the relatively narrow outlet opening 18 in the head, causes a spontaneous and violent separation of the mixture in the vacuum chamber.

That is, the liquid and vapor phases are discharged through the narrow elongated outlet 18 and are broken up or particulated into substantially a fog from which the cream or milk on the one hand and the water-vapor and gases on the other separate out in the chamber 9.

The diameter of the line 12—13 and the peripheral dimension of the members defining the outlet in the head, and the diameter of the steam inlet and the pressure of the steam are selected or controlled, to produce the required result within (1) the range of adjustment permitted for the outlet opening in the head, and (2) the range of the reduced pressure maintained in the vacuum chamber and the size thereof. In other words, it is essential that these parts be so related that the proper pressure differential will be established and that sufficient time will be permitted before the mixture enters the chamber, (1) for intimate mixing of the steam and lactic fluid, (2) for reaching a temperature sufficient for pasteurization and (3) for compressing the mixture to preliminarily subdivide the same. In this manner, the mixture discharged from the head will be subjected to violent expansion and separation of the volatile and non-volatile constituents, and the liquid phase is finely sub-divided. Therefore, due to the disposition of the head with respect to the chamber, as described above, and the heated inner wall surface of the chamber, the volatile constituents will be separated and drawn off without objectionable condensation on the wall or entrainment of the non-volatile constituents, which latter will gravitate and be collected in coalesced condition at the bottom of the chamber.

The invention is applicable to milk, cream, ice cream mix and milk products in general, and for convenience, I shall describe the treatment of sour cream (any cream in which the titratable acidity calculated as lactic acid exceeds .25%) to improve the same and render it satisfactory for the manufacture of butter.

Conventional practice comprises reduction of the acidity of the sour cream to a point at which satisfactory churning may be accomplished. Normally this point lies within a range from .18 to .25%, as lactic acid. Upon completion of the acid reduction, the practice is to pasteurize in any suitable manner. The neutralizing and pasteurizing steps exert some flavor improving effects, due to the volatization of certain flavors.

Referring to Figures 9, 10 and 11, I have illustrated a modification of the heating jacket 27. In these figures, the chamber 9 is heated by a coil 27' placed therein through which the heating medium, i. e. steam or hot water circulates to maintain the temperature at or preferably slightly above the boiling point of the cream under the corresponding conditions of vacuum.

In Figure 9 the coil 27' is disposed below the distributor head, in Figure 10 surrounding the same, and in Figure 11 above the head. All three dispositions of coils may be used in some cases and combined in any suitable manner.

In Figure 12 I have illustrated the coil 27' of Figures 9, 10 and 11 as electrically heated by a conventional electrical heating element 28' and in Figure 14, I have illustrated a fragmentary view of the jacket 27 heated by a similar electrical heating element.

In Figure 13 I have illustrated a means of supplying a heated circulating medium such as hot water to the jacket 27 or coil 27'. The warm water from the condenser 21 is pumped through line 35 in any suitable manner and a steam ejector 36 is employed to raise the temperature of the water as desired. The ejector 36 is controlled by a suitable thermostat 37 to regulate this heating of the water and assure that it will be delivered to the jacket or coil at a constant required temperature.

By the processes now to be described, I find that more effective improvement of the cream is attained. I shall assume, as in ordinary cases, that the sour cream is collected in a suitable vat with means for mixing and sampling and possesses varied percentages of acidity.

Process A

The cream, as received, is warmed to a point where it can be conveniently handled with the usual dairy equipment. Normally, this temperature will not exceed 110° F., preferably 90–100° F. Thereafter, the acidity is reduced, if necessary, by a neutralizing treatment as understood in the practice. I find it preferable to operate with the acidity of the sour cream at approximately .3% calculated as lactic acid.

After a suitable time has been allowed for the action of the neutralizing agents, the cream is then quickly heated to a temperature of 150–165° F., and preferably not to exceed 170° F. in a conventional heater, such as one of the continuous type.

The cream at this temperature is transferred to the tank 10 through pipe 8. When proper level in the tank 10 is attained, the float will open the valve and by virtue of the difference in pressure between the outside atmosphere and the chamber 9, in which a reduced pressure is being maintained, the liquid will be forced into the line 12—13 and through the distributor head 17 into the vacuum chamber.

As soon as flow is established, steam under a pressure of substantially 50 to 100 lbs. is introduced into the cream in the line 12 through the steam line 14, as shown in Figures 1 and 3. The outlet of the steam pipe extends above the lateral outlet 11 of the tank 10. This assures that the steam will travel in a direction toward the vacuum tank whereby (1) the pressure of the mixture in the line 12—13 is increased, (2) intimate mixing of the steam and cream is accomplished, since no opportunity is presented for building a back pressure or forcing steam into the tank 10, and (3) the steam is introduced at a safe point and relatively close to the outlet of the tank, so that a maximum contact of liquid and steam is maintained from the tank to the vacuum chamber and head.

In this steam treatment the latent heat of the steam is very largely transferred to the cream (1) part of the cooled steam condenses and (a) the heat of condensation also is transferred to the cream, resulting in a cream-water mixture having a pasteurizing temperature of substantially 185° F., (b) the condensation of the steam with sudden collapse of the steam bubbles upon coming in contact with relatively cooler cream will cause a breaking up of the fat globules with consequent release of volatile odoriferous substances occluded within the fat clumps, and (c) the heating effect, the release of volatiles and the uncondensed portion of the steam produces a compression, i. e., a building up of pressure in the line 12—13, and (2) the uncondensed steam exerts a sweeping action in that it serves as a carrier for the volatile or vapor phase constituents of the cream released by the shattering actions and heating effect of the steam.

This heating or pasteurization of the cream and its intermixing with the steam, as well as the breaking up of the fat clumps with release of volatiles, takes place during the continuous passage of the mixture from the tank and steam outlet to the distributor head 17 and under the influence of the vacuum.

In connection with the use of steam, it will be understood that other inert gases may be employed. Steam is most convenient and economical and it will be used in such quantities and pressures as to raise the temperature of the mixture to the pasteurizing temperature of substantially 185° F. The temperature of the cream in the line can be controlled (1) by regulating the amount of steam or cream or both supplied to the line and (2) by regulating, initially the temperature of the cream.

Referring to Figure 2, the outlet 18 of the distributor head 17 is adjusted, so that the total area of the peripheral opening is a small fraction, for example one-tenth ($\frac{1}{10}$) of the cross-sectional area of the line 12—13.

This fraction will be determined by the condition of the cream, i. e., the amount of deodorization required. In the case of feed flavors such as onion and garlic, which are relatively easily volatilized, the opening of the distributor head can be set at a maximum. Again where the off-flavors are of a more tenacious character and of fermentation or bacteriological origin, the opening is reduced to a minimum.

It will be observed that the steam line 12—13 extends into the vacuum chamber and communicates therewith through the head 17 which is substantially centrally disposed in the chamber.

On the outside of the head, there is maintained a condition of reduced pressure preferably 24–25″ and up to 28″ or more of vacuum. On the inside of the head is present a cream-water-steam mixture under sufficient pressure as above described to produce a pressure differential of substantially one atmosphere. This will vary with the conditions of operation as outlined above, and the differential may be in some instances greater or less than one atmosphere.

By reason of the small area of the outlet opening 18 in the head and the pressure differential maintained as just described, the cream-water-steam mixture is ejected into the chamber with violent and spontaneous expansion. A fog of finely divided cream and water vapors and gases is produced. The finely divided cream particles of the fog gradually coalesce and drop to the bottom of the chamber where they are collected and continuously removed while the vapors and gases are withdrawn through the outlet 19 by the vacuum pump to the condenser system.

The relative fineness or division of the cream particles and consequent effective deodorization and rapidity of cooling, is greatly enhanced by the use of a distributing head having a substantially continuous elongated or peripheral and narrow opening. The sudden release of the cream at a pasteurizing temperature into the vacuum chamber with instantaneous cooling to the boiling point of the liquid is instrumental in preventing at the prevailing pressure, which point normally approximates 130–145° F., formation of grainy texture or a weak body in any resulting butter or manufactured milk product. For example, the length of the peripheral opening in Figure 2 will be substantially nineteen (19) inches and the width of the opening will be substantially 0.025 inch and the diameter of the line 12—13 substantially two and one-half (2½) inches or in equivalent ratios.

By reason of the use of a distributor head and the spontaneous and violent ejection of the water-cream-steam mixture due to the pressure differential, I greatly reduce foaming and consequent cream losses through entrainment.

The inclined walls of the opening 18 and baffle 31 act to deflect the fog downwardly, so as to diminish the possibility of entrainment of the cream particles with the vapors and gases withdrawn through the outlet 19. The area of the baffle is such that it will effectively deflect the major portion of the fog without, however, restricting the net free area between the outside periphery of the baffle and the internal wall surface of the chamber to such a point that the average velocity of the vapors does not attain a critical velocity of entrainment, e. g., twenty (20) feet per second for water vapor.

The chamber 9 is heated by means of the heating jacket 27 and the temperature thereof and of the inner exposed wall of the chamber is maintained substantially constant and at the temperature corresponding to the boiling point of the cream under the conditions of vacuum being maintained and preferably slightly higher, e. g., with a vacuum of 24–25″, the water circulating in the jacket is maintained at substantially 145–130° F. I find that by using a heated chamber under the conditions of temperature and vacuum set forth above, that the deodorizing effect is increased, because of the fact that I can completely prevent any condensation of vapors or gases on the wall of the chamber and consequent return of separated odoriferous substances to the collected cream in the bottom of the chamber. By maintaining this increased temperature on the wall, I also prolong the evolution of steam or evaporation from, as well as consequent deodorization of, the cream particles as they coalesce and gravitate.

It will, therefore, be seen that the initially warmed cream is intimately mixed with steam and subjected in the line 12—13 under the influence of the vacuum in its passage to the evacuated chamber, to a pasteurizing treatment and concomitantly there takes place a breaking up of the fat clumps with resultant release of odoriferous volatile matter. The steam and vapors act as a carrier for such evolved gases. The resultant mixture is compressed and a pressure differential is set up between the reduced pressure maintained in the evacuated chamber and the cream-steam-water mixture in the line.

By reason of the narrow and elongated opening in the head and the pressure differential, the mixture is discharged with spontaneous and violent expansion into the heated vacuum chamber in a very finely divided condition. The head is positioned centrally with respect to the chamber, whereby there is sufficient time for the separation of the liquid and vapor phases, so that (1) the cream will coalesce and gravitate without entraining vapors or odoriferous gases, and (2) the vapors and gases do not entrain the cream and also they are prevented from condensing by the heated chamber.

The substantially spontaneous and violent release of the mixture with creation of a fog produces (1) cooling of the liquid phase as well understood because of withdrawal of heat by evaporation in the vacuum chamber, and (2) the water vapor and gases carrying odoriferous substances previously released in the line 12—13 continue to have this function in the chamber and are the vehicle by which the odoriferous substances are carried from the chamber to the condenser system. In this manner, deodorization is accomplished effectively and an improved cream is collected at the bottom of the chamber. Recontamination is prevented since the chamber is heated, and thus condensation on the wall is prevented, as well as prolonged evaporation of water and evolution of gases from the cream particles assured.

The cream at substantially 130–145° F. is withdrawn from the bottom outlet 23 of the chamber and passed through the system of coolers 24 by means of a pump 25 and discharged through pipe 26. The speed or capacity of the pump 25 will be adjusted automatically or manually to remove the cooled cream at substantially the same rate as the liquid collects at the bottom of the chamber. Under these conditions of inflow and outflow, no appreciable dilution of the treated cream will ensue inasmuch as the amount of dilution introduced by the condensation of the injected steam in line 12—13 is evaporated and withdrawn in the vacuum chamber as described. That is, the cream-steam-water mixture is condensed or concentrated in the chamber 9 to remove both the volatile odoriferous vapors and condensed steam.

The cream collected from pipe 26 is recovered in pasteurized condition, greatly improved as regards flavor and odor, and is of excellent quality for manufacture of dairy products. The treatment described does not impart any detrimental properties to the cream, which in any way affects its suitability for butter making, as evidenced by the fact that there are no increased butterfat losses in the butter milk or any undesirable body characteristics imparted to the resulting butter.

*Process B*

This process is distinguished from Process A in that there is no initial reduction of acidity in the case of sour cream. That is, in this process the pasteurized deodorized cream is neutralized, if necessary, after discharge from the outlet 23 or the discharge pipe 26. In the event that the cream under treatment has an initial and appreciable acidity, its pasteurization and deodorization is accomplished without recourse to an initial neutralization or acid reduction and without detrimental curd formations, due to the breaking up of the cream in the line 12—13 and the chamber 9 as described.

I have found that it is possible to pasteurize the sour cream, and by this process, in some cases, a better pasteurization is obtained.

It will be observed that with the present invention, the cream is ejected into the vacuum chamber with violent and spontaneous expansion whereby the liquid and vapor phases are effectively separated. The vacuum chamber therefore constitutes a separating chamber in which the optimum amount of deodorized cream is recovered.

Further, it will be observed that with the present invention the cream is continuously pasteurized and partially deodorized in advance of the distributor head, and in this condition is ejected as described to assure a very thorough separation in the vacuum chamber. In other words, there takes place in the line 12—13 not only a pasteurization and a building up of pressure, but as well, an initial or partial separation of the liquid and vapor phases of the cream.

As heretofore described the cream is heated (1) in the steam line 12—13 and (2) in the vacuum chamber, and in each case while under the influence of the vacuum. That is, the compressed mixture in the line 12—13 is under the directional influence of the vacuum in cooperation with pressure and velocity of the mixture in the line. Of course, in the vacuum chamber the fluid is under the direct expansive influence. This is accomplished continuously without hardening of the curd or curd constituents and the heating of the chamber 9 assures maximum constant separation and removal of volatiles including condensed steam.

This application is a continuation in part of my co-pending application Serial No. 654,069, filed January 28, 1933, which has matured into Patent No. 2,022,419, dated November 26, 1935.

I claim:

1. An apparatus for treating liquids such as lactic fluids comprising a vacuum chamber, means for maintaining reduced pressure therein including a withdrawal passage adjacent one end of the chamber, a line communicating with a source of liquid supply and extending within said chamber, said line terminating at its end within the chamber in a reduced outlet whose total cross-sectional area is a small fraction of the cross-sectional area of the line, means for injecting steam into the line at sufficient distance from said reduced outlet and without the vacuum chamber, whereby a pressure differential is built up between the line side of the reduced outlet and the vacuum chamber side sufficient to cause violent and spontaneous expansion of the mixture introduced to the chamber, said outlet positioned centrally of the chamber and having mounted thereon in surrounding relation, a downwardly inclined baffle to discharge the mixture downwardly and outwardly in said chamber and in freely suspended finely broken state, the outlet being sufficiently below the said pressure reducing passage to prevent entrainment and far enough from the bottom of the chamber to give the falling particles projected from the outlet a sufficient time for adequate separation out of the vapor and liquid phase constituents, said means for creating a reduced pressure operating to remove vapor phase constituents through said passage, and another outlet remotely spaced from said passage for removing liquid phase constituents.

2. An apparatus for treating liquids such as lactic fluids comprising a vacuum chamber, means for maintaining reduced pressure therein including a withdrawal passage adjacent one end of the chamber, a line communicating with a source of liquid supply and extending within said chamber, said line terminating at its end within the chamber in a reduced outlet whose total cross-sectional area is a small fraction of the cross-sectional area of the line, means for injecting steam into the line at sufficient distance from said reduced outlet whereby a pressure differential is built up between the line side of the reduced outlet and the vacuum chamber side sufficient to cause violent and spontaneous expansion of the mixture introduced to the chamber, said outlet having mounted thereon in surrounding relation, a downwardly inclined baffle to discharge the mixture downwardly and outwardly in said chamber and in freely suspended finely broken state, the outlet being sufficiently below the said pressure reducing passage to prevent entrainment and far enough from the bottom of the chamber to give the falling particles projected from the outlet a sufficient time for adequate separation out of the vapor and liquid phase constituents, said means for creating a reduced pressure operating to remove vapor phase constituents through said passage, and another outlet remotely spaced from said passage for removing liquid phase constituents.

HERMAN C. HORNEMAN.